Sept. 1, 1936.   C. L. EASTBURG   2,052,702
ROLLER BEARING AXLE
Filed Jan. 2, 1935   2 Sheets-Sheet 1

INVENTOR:
Clifford L. Eastburg,
by Cantlan & Gravely,
HIS ATTORNEYS

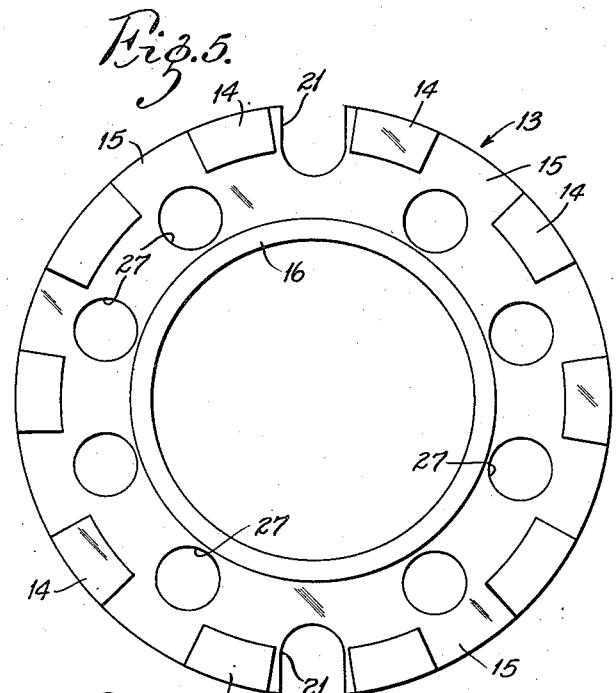
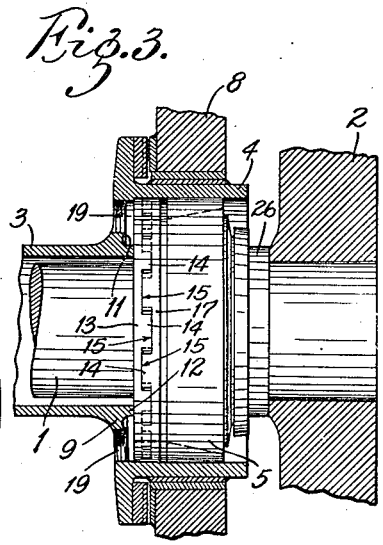
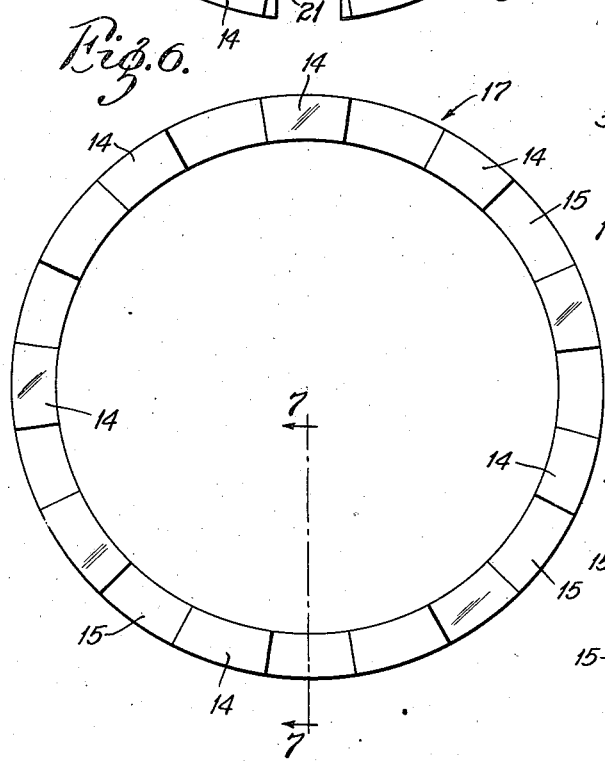
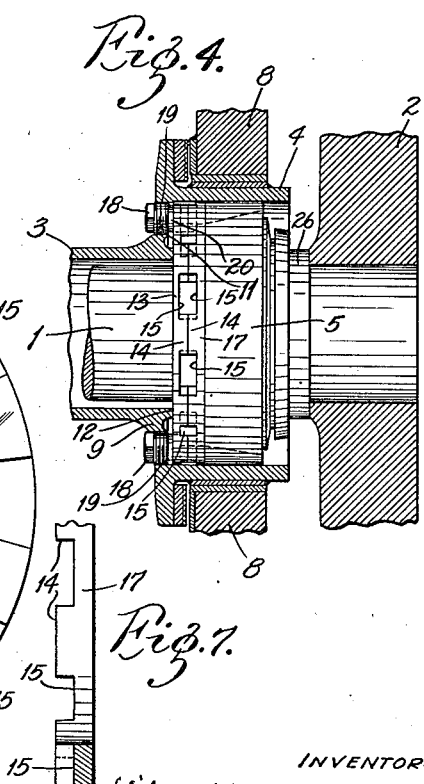
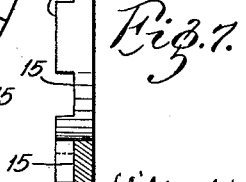

Patented Sept. 1, 1936

2,052,702

UNITED STATES PATENT OFFICE 2,052,702

ROLLER BEARING AXLE

Clifford L. Eastburg, Canton, Ohio, assignor to The Timken Roller Bearing Company, Canton, Ohio, a corporation of Ohio Application January 2, 1935, Serial No. 24

3 Claims. (Cl. 295—36)

My invention relates to roller bearing axle constructions of the type wherein roller bearings are interposed between an axle and a housing surrounding said axle, particularly to locomotive driver axle and similar axle constructions. The present invention is an improvement on my Patent No. 1,732,263 dated October 22, 1929, wherein the outer bearing member of the roller bearing is backed up in the housing by means of a crenellated ring whose bosses normally engage bosses on the face of a web portion of said housing, but which may be turned so that its bosses fit into the spaces between said housing bosses to allow clearance necessary in disassembling the axle from the bearings.

The present invention has for its principal objects to strengthen the construction of said patent, to simplify the disassembling operation and to provide for a safety bomb or other signal device to indicate overheating of the bearings.

The invention consists principally in providing two crenellated rings in said housing, in the means for positioning and releasing said rings and in the adaptation of said positioning means to include the mounting of a signal device. The invention further consists in the roller bearing axle and in the parts and combinations and arrangements of parts hereinafter described and claimed.

Figure 1:
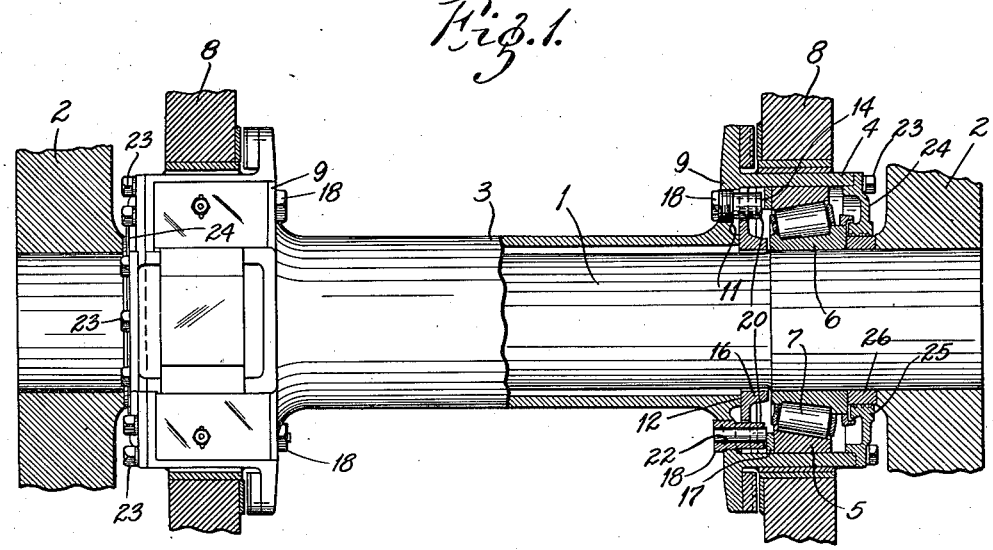
Figure 2:
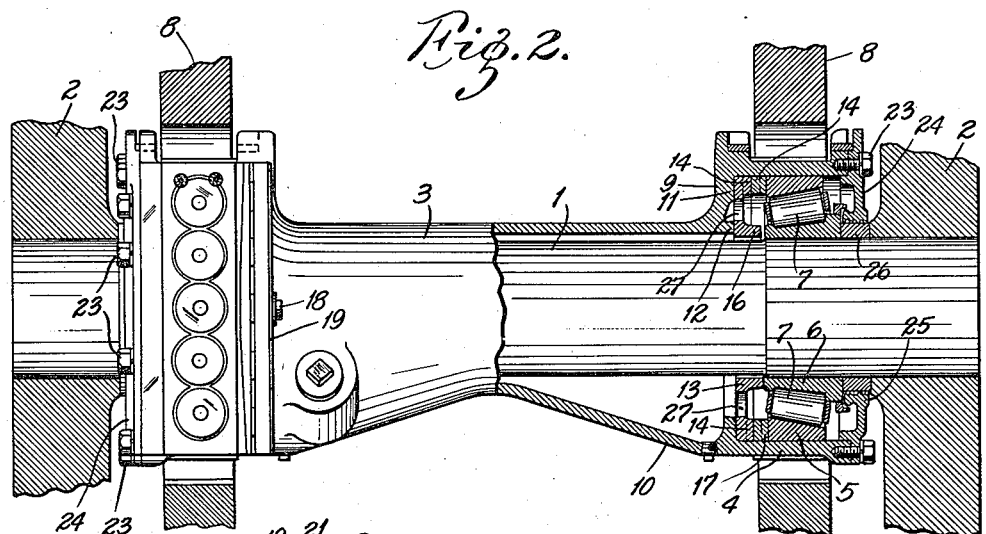
Figure 3:
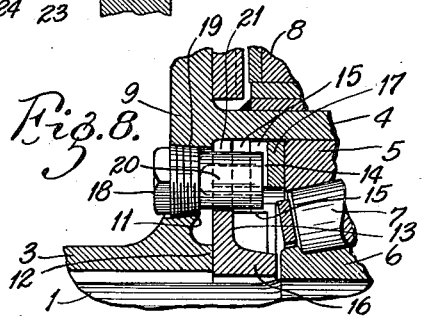

In the accompanying drawings, wherein like symbols refer to like parts wherever they occur, Fig. 1 is a half plan view, half sectional view of the locomotive driver axle embodying my invention, Fig. 2 is a half side elevation, half vertical sectional view, Fig. 3 is a view similar to the sectional portion of Fig. 1, showing the crenellated rings in plan and arranged in nested position so as to free the bearing cup, Fig. 4 is a view similar to Fig. 3 showing said rings with their bosses in abutting relation so as to back up said bearing cup, Figs. 5 and 6 are elevations of said rings respectively, Fig. 7 is a sectional view on the line 7—7 in Fig. 6; and Fig. 8 is an enlarged fragmentary sectional view similar to the sectional portion of Fig. 2.

In the drawings is illustrated a locomotive driver axle 1 having drive wheels 2 on each end. A hollow axle housing 3 is provided for said axle 1 and antifriction bearings are interposed between the enlarged tubular end or journal box portions 4 of said housing and the axle. The drawings illustrate taper roller bearings, each comprising a cup 5 or outer bearing member mounted in the housing, a cone 6 mounted on the axle and conical rollers 7 between said cup and cone. The outer surfaces of said housing portions are shaped to cooperate with suitable truck frame members 8.

The housing has a substantially radial web 9 around most of its periphery connecting it with the enlarged journal box portion. The lower portion 10 of the housing flares downwardly from the middle towards the end and at the bottom, merges into said box portion 4. The bearing box portion 4 is provided with an inwardly extending radial flange 11, most of which is formed by the outer portion of said web. The interior of the housing is provided with an internal longitudinally extending rib portion 12 which is a substantial continuation of the body of the housing and whose end is in radial alinement with the face of said internal radial flange 11. Mounted in said housing 3 against said radial flange 11 and said internal projecting rib portion 12 of said axle is a ring 13 having a crenellated portion around the periphery of one face composed of alternating bosses 14 and depressions 15 and having a sleeve portion 16 around its inner periphery abutting at one end against said end 12 of said housing and normally spaced slightly at its other end from the adjacent inner bearing cone 6. A second crenellated ring 17 is interposed between the crenellated portion of said first ring 13 and said bearing cup 5, the crenellated faces of said rings opposing each other. In the assembled operating position, the bosses 14 of said rings abut against each other and the bearing cup 5 is thus held in position by means of said rings 13, 17 and said flange 11 in said housing. The rings 13, 17, are held in position by means of locking plugs 18 threaded into holes 19 in the web portion 9 of said housing and having projecting stems 20 passing through holes 21 in said ring 13 into spaces 15 between bosses of said second rings 17, thereby holding said rings 13, 17 against rotation.

One of said locking plugs 18 may be provided with a bore 22 to hold a signal device, for example a smoke bomb of the type shown in Faus Patent No. 1,979,875 dated November 6, 1934 with its end portion adjacent to said outer bearing member so as to be discharged if said bearing cup becomes overheated.

Secured to the outermost end of the journal box portion 4 of the axle housing as by screws 23 is a closure ring 24 that has an inner peripheral portion 25 cooperating with a spacer ring 26 mounted on the axle between the wheel hub and the outermost end of said bearing cone. Said ring 13 is provided with holes 27 which lighten it and also permit lubricant to pass therethrough.

In disassembling the axle from the bearings, the locking plugs 18 are removed from one end of the housing and the housing 3 is moved endwise away from the end from which said plugs had been removed, such movement being permitted to the extent of the clearance in the roller bearing itself. A tool is then inserted through said plug holes 19 and said crenellated rings 13, 17 are loosened from their pinched position between the bearing housing and the bearing cup. Relative rotation of said rings 13, 17 bring the bosses 14 of each ring into alinement with the spaces 15 of the other ring and said rings can then be nested so that said second ring 17 is clear of the bearing cup. The screws 23 are then removed and the whole structure placed in a wheel press and the axle removed from the bearings as set forth in my said Patent No. 1,732,263 dated October 22, 1929.

The crenellated rings 13, 17 may be made of hardened steel, so as to withstand the heavy stresses to which they are subjected. The locking plugs 18 are conveniently located and the inner side of the housing end is flush with the pedestal guides. All of these features constitute important practical advantages.

Obviously numerous changes may be made in details of construction without departing from the invention and I do not wish to be limited to the precise construction shown.

What I claim is:

1. An axle bearing construction comprising a wheeled axle, a housing therefor having an enlarged tubular end portion provided with an inwardly extending radial flange, a roller bearing interposed between said axle and said tubular end portion and a pair of crenellated rings interposed between the outer bearing member of said bearing and said flange of said housing with their crenellated faces opposing each other, said housing having an internal longitudinal projection terminating flush with said radial flange and the crenellated ring seated against said flange also having a sleeve portion with one end engaging the end of said longitudinal projection and with the other end terminating adjacent to the inner bearing member of said roller bearing.

2. An axle bearing construction comprising a wheeled axle, a housing therefor having an enlarged tubular end portion provided with an inwardly extending radial flange, a roller bearing interposed between said axle and said tubular end portion, a ring mounted in said housing having a plain face seated against said radial flange and having the peripheral portion of its other face crenellated, a second ring having a plain face seated against the outer bearing member of said bearing and having a crenellated face opposed to the crenellated face of said first mentioned ring, said first mentioned ring having openings therethrough near its outer periphery and securing lugs mounted in said radial flange and extending through said openings into the spaces between bosses of said second crenellated ring.

3. An axle bearing construction comprising a wheeled axle, a housing therefor having an enlarged tubular end portion provided with an inwardly extending radial flange, a roller bearing interposed between said axle and said tubular end portion, a ring mounted in said housing having a plain face seated against said radial flange and having the peripheral portion of its other face crenellated, a second ring having a plain face seated against the outer bearing member of said bearing and having a crenellated face opposed to the crenellated face of said first mentioned ring, said first mentioned ring having openings therethrough near its outer periphery and securing lugs mounted in said radial flange and extending through said openings into the spaces between bosses of said second crenellated ring, said first mentioned ring also having openings therethrough permitting lubricant to pass from the body of said housing to said bearing.

CLIFFORD L. EASTBURG.